Sept. 24, 1957        L. O. UPTON        2,807,122

METHOD OF FORMING AND FUSING GLASS ARTICLES

Filed May 26, 1954        2 Sheets-Sheet 1

INVENTOR
LEE O. UPTON
BY
ATTORNEY

Sept. 24, 1957 L. O. UPTON 2,807,122
METHOD OF FORMING AND FUSING GLASS ARTICLES
Filed May 26, 1954 2 Sheets-Sheet 2

INVENTOR
LEE O. UPTON
BY
*Louis L. Gagnon*
ATTORNEY

United States Patent Office 2,807,122
Patented Sept. 24, 1957

2,807,122
METHOD OF FORMING AND FUSING GLASS ARTICLES

Lee O. Upton, Sturbridge, Mass., assignor to American Optical Company, Southbridge, Mass., a voluntary association of Massachusetts Application May 26, 1954, Serial No. 432,414

5 Claims. (Cl. 49—82.1)

This invention relates to improvements in fused glass articles and has particular reference to the method of controlling the interfacial characteristics of the heat-joined surfaces of such articles.

It has been found in the art of preparing glass surfaces for fusion with each other, particularly in forming fused blanks for multifocal lenses wherein glasses containing a high percentage of silica are used, whether said surfaces are formed by grinding and polishing or by fire glasing, that, due to the chemical activity of such glass surfaces, moisture molecules from the air and/or gases of other species such as carbon dioxide, ammonia or the like, will deposit themselves on said surfaces and, in the case of moisture reaction with the glass will form what is known as a hydrated silicate surface film, and in the case of exposure to carbon dioxide or ammonia it is believed that complex reactions take place which increase the gas adsorptive capacity of the glass surfaces. This hydrated silicate film results from moisture from the atmosphere taking the place of oxygen atoms which are removed from the vicinity of the silica atoms during such grinding and polishing operations or fire glazing. The moisture molecules which are attracted to the glass surfaces tend to migrate thereof and orient themselves into position of lowest equilibrium through the tendency thereof to find that portion of glass surface which is charged most highly and to which they can adhere most tenaciously. They then chemically combine themselves with the silicon atoms in the glass surface to form the hydrated silicate surface film. This film, during the fusing of the glass surfaces to each other, becomes decomposed and gives off gases which become trapped between the two glass layers and thereby cause undesirable interfacial bubbles. These bubbles in fused blanks for bifocal lenses render them unsuitable for use and, in the past, have caused a large percentage to be rejected.

It, therefore, is one of the primary objects of this invention to provide, in the art of fusing glass articles such as lens blanks or the like, a novel method of controlling the interfacial characteristics of the heat-joined surfaces of such glass articles.

Another object is to provide a novel method of conditioning glass surfaces for fusion such, for example, as the ground and polished surfaces of the pieces of glass used in forming fused multifocal lenses or the like, whereby the resultant heat-joined surfaces will be substantially free from interfacial bubbles or other imperfections which might be detrimental to the resultant optical quality of the lenses formed from said heat-joined pieces of glass.

Another object is to provide a novel method of controlling the rate of adsorption of moisture from the atmosphere upon surfaces of pieces of glass having a high silica content and which are to be heat-joined with each other whereby the said surfaces will be substantially free from hydrate silicate during the fusing of said surfaces to each other.

Another object is to provide, in the art of fusing pieces of glass to each other, a novel method of treating said pieces of glass by refrigeration to dehydrate said surfaces and thereafter heat-joining said surfaces within a time interval so controlled as to avoid adsorption of moisture from the atmosphere and the forming of a hydrated silicate film on said surfaces.

Other objects and advantages of the invention will become apparent from the detailed description which follows when taken in conjunction with the accompanying drawings in which.

Figure 1:
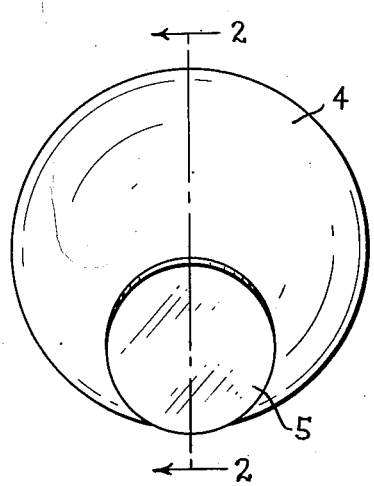
Fig. 1 is a face view of a blank of a multifocal lens to be formed in accordance with the present invention.
Figure 2:
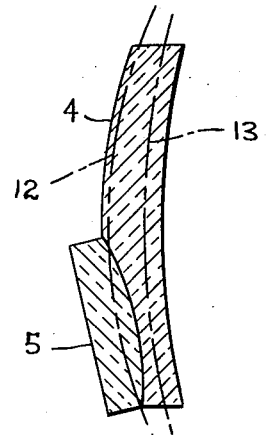
Fig. 2 is a sectional view taken as on line 2—2 of Fig. 1 and looking in the direction indicated by the arrows.

Referring more particularly to the drawings wherein like characters of reference designate like parts throughout the several views, there is illustrated one form of article with which the present invention has proven to be extremely useful. This article is known as a blank for use in forming fused bifocal ophthalmic lenses and comprises a major portion 4 preferably formed of crown glass having an index of refraction of 1.5275 and having fused thereto a button or minor portion 5 of high index glass such as flint or barium crown glass having an index of refraction of approximately 1.6. The fusing of the pieces of glass 4 and 5 to each other is accomplished in the conventional manner by first forming a countersink 6 of a predetermined curvature in the major portion 4 by grinding and polishing the countersink to an optical surface. The button or minor piece of glass 5 is then provided with a ground and polished curved surface 7 of a controlled convex curvature simulating the curvature of the countersink of a radius slightly less than the curvature of the countersink. The major piece of glass 4 is supported on a suitable block of refractory material 8 having its upper supporting surface 9 of a curvature substantially that of the adjacent curved surface of the major blank 4. The button or minor piece of glass 5 is supported in overlying relation with the countersink 6 with the inner edge of its surface 7 engaging the edge of the countersink as illustrated at 10. The outer portion of the button or minor piece of glass 5 is supported in spaced relation with the countersink by a suitable spacer member 11. The assembly is then placed in an oven and heated to a temperature sufficient to cause the button 5 to soften by an amount sufficient to cause the surface 7 thereof to assume the surface shape of the countersink 6 and to become fused with said surface 6. The blank is then finished in a conventional manner by grinding and polishing the opposed sides of the blank to finished curvatures such as diagrammatically illustrated by the dot and dash lines 12 and 13.

It is pointed out that the major crown glass portion 4 and the button or minor piece of glass 5 preferably have substantially the same coefficient of expansion. However, the major crown portion 4 has a much higher melting point than the flint or barium crown glass button or minor piece of glass 5. In the present example the softening temperature of the major crown glass portion 4 is around 1250° F. while the softening temperature of the button or minor piece 5 is around 900° F.

During the heating and dropping of the button or minor piece of glass 5 to the shape of the countersink 6, the spacer member 11, as said button or minor piece of glass 5 softens, will cause the inner portion of the surface 7 adjacent the point of contact 10 to first drop to the shape of the adjacent portion of the curve of the countersink 6. The said dropping thereafter progressively takes place in an outward direction whereby no air will be pocketed or trapped between the fused surfaces.

It has been found, however, that even though the dropping of the button or minor piece of glass 5 progressively takes place in an outward direction whereby no air is pocketed or trapped between the fused surfaces, that under different atmospheric conditions imperfections in the form of bubbles or other irregularities develop between said fused surfaces. This defect has been found to be due to the formation of a hydrated silicate film on the surfaces of the pieces of glass to be fused and to the tendency of said hydrated silicate films to decompose within the fusing range.

It has further been found that although decomposition of the hydrated silicate film starts at temperatures below the fusing temperature it continues at temperatures as high as from 1200° to 1300° F. or that of the fusing temperature. Therefore, the resistance of the hydrated silicate film to decomposition at said high temperatures and the liberation of gases throughout the fusion range results in the formation of trapped bubbles or other undesirable imperfections in such magnitude as to render the resultant fused composite glass blanks impractical for use. Therefore, it is the essence of this invention to provide a technique of fusion whereby the heat-joined surfaces 6 and 7 of the major and minor pieces of glass 4 and 5, respectively, will be substantially free of hydrated silicate at the time of fusion.

Research has proven that physical adsorption of gases on solid surfaces decreases with increasing temperature and increases with decreasing temperature. However, chemical reaction rates of gases with solid surfaces, in this case moisture with glass surfaces, increases with increasing temperature and decreases with decreasing temperature. Moisture-glass reactions are sufficiently rapid, even at room temperatures, to cause serious surface hydration of a glass. Conversely, even though with a reduction of temperature the physical adsorption of moisture on a glass surface increases rapidly, the actual amount of moisture present in the atmosphere at reduced temperature is quite small and the chemical reaction rate between said moisture and said glass surfaces, owing to the low temperature, is reduced to a negligible amount, thus inhibiting the formation of a hydrated silicate film on the glass surfaces. By lowering the vapor pressure by reducing the temperature, both the rate and maximum quantity of moisture then can be adsorbed on a glass surface is reduced.

Based on the fact that space can hold a definite amount of moisture which is dependent almost entirely upon the temperature of that space (in this case air), both the major and minor pieces of glass, after having the surfaces 6 and 7, respectively, formed thereon are placed in a refrigerator within a time interval wherein a minimum hydrated silicate film will form on said surfaces and at a temperature of from 5° to 10° below zero so that the glass itself can be held at approximately 0° F. This refrigerating of the major and minor pieces of glass reduces the moisture concentration in the atmosphere to a negligible amount and in so doing, that is, in reducing the temperature to an optimum point, the reaction rate of the moisture molecules with glass molecules is also reduced to a negligible rate. This, in turn, reduces the rate of formation of hydrated silicate on the surfaces of the glass pieces. Concurrent with these two phenomena, no reaction between ice and glass are known. Therefore, no film forms on the surfaces of said glass pieces because the refrigerating thereof to the temperature set forth above causes no moisture to exist as such but rather in the form of ice. The glass pieces are allowed to remain in the refrigerator for a time interval sufficient to bring about dehydration as a result of said refrigeration. This is due to the fact that the moisture migrates from the glass to the refrigerator coils and thus dehydrates the glass. A good example of this is of the dehydration effect of the ordinary home freezing unit.

It is preferable, in the present instance, to use a system of refrigeration other than an ammonia system owing to the fact that there is experimental reason to believe that the presence of ammonia gas in the vicinity of a wet glass surface produces detrimental results owing to the solution of the ammonia in the water and the subsequent reaction between ammonia water and the glass surfaces.

It has also been found that refrigeration by artificial ice such as carbon dioxide or Dry Ice produced detrimental results similar to those of the ammonia systems.

Figure 3:
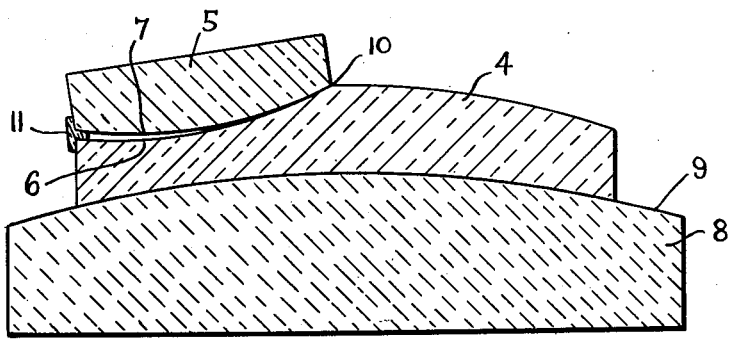
Fig. 3 is a view generally similar to Fig. 2 illustrating one step of a conventionally known method of supporting the pieces of glass for heat-joining with each other to form the blank illustrated in Figs. 1 and 2.
Figure 4:
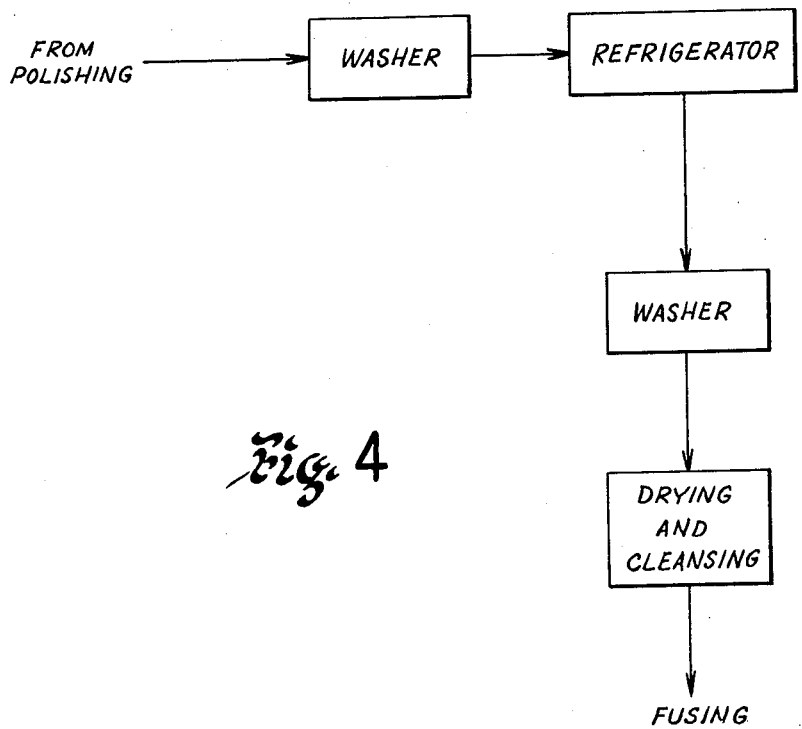
Fig. 4 is a flow sheet showing of the process embodying the invention.

It has been found that the following procedure as diagrammatically illustrated in Fig. 4 has provided extremely satisfactory results. Directly subsequent to the grinding and polishing of the countersink curve 6, the major piece of glass or lens blank is removed from its holder and is washed to remove the adhesive or pitch which is used to retain said blank on its holder. Within a relatively short time interval of from one to two hours the blank is placed in the refrigerator at a temperature within the range specified above. This same procedure is followed with the button or minor segment 5. The major and minor pieces of glass are allowed to remain in the refrigerator for approximately seven days or until essentially complete dehydration takes place. They are not necessarily dried by wiping after they have been initially cleansed and prior to being placed in the refrigerator. The cleansing is preferably done with pond water heated to a temperature of from 125° to 135° F. Pond water or water containing organic and/or inorganic contaminating ions is used as it retards to a large degree development of hydrated silicate on the ground and polished surfaces of the pieces of glass. Adsorbed moisture from atmosphere is pure distilled water and is known to be one of the most reactive materials with glass surfaces. Therefore, the use of pond water or water containing contaminating ions is desirable and preferable. When removed from the refrigerator the pieces of glass are dry and cold but upon exposure to room temperature they immediately become fogged by the deposition of moisture thereon because they are below the dew point. The moisture immediately freezes and becomes ice. As the pieces of glass absorb heat at room temperature, the ice will melt and distilled water will remain on the glass surfaces and will immediately cause a hydrated silicate film to form thereon. Because of this fact, immediately upon being removed from the refrigerator, the pieces of glass are dipped into pond water which is approximately at room temperature. This raises the temperature of the pieces of glass above the dew point and thereby prevents atmospheric moisture precipitation on the surfaces. The pieces of glass are now wiped dry and clean, assembled as shown in Fig. 3, and fused as soon as possible. It has been found that if the above procedure is carried out within three to five hours satisfactory results will be obtained. However, if the pieces of glass are allowed to remain unfused at room temperature say, for twenty-four hours, a hydrated silicate film of a detrimental amount will form thereon.

Fusion is brought about in the known manner by placing the assembly, such as shown in Fig. 3, in a suitable furnace at a temperature of approximately 1250° F.

Although crown glass contains a high percentage of silica and it is this high silica content which causes such glass to be a more active adsorber, such crown glass has become a standard used throughout the optical industry for many years. It is relatively cheap, readily obtainable in high quality from several different sources and possesses other highly desirable characteristics for ophthalmic purposes. Also the index of refraction of crown glass is a standard which controls the charted curves which have been commercially established and used to produce the resultant powers of lenses desired and further controls the surface curvatures of the tools or laps that are used in grinding and polishing the lenses. This is because the curved surfaces of commercial tools or laps are computed in accordance with the index of refraction of crown glass to produce the resultant refractive powers desired.

In view of the above it is extremely desirable to retain crown glass as a standard and the present invention, therefore, is directed to the provision of a novel method of overcoming one of the major difficulties thereof which has been encountered in the past particularly in forming fused bifocal or multifocal lenses.

While the novel features of the invention have been shown and described and are pointed out in the annexed claims, it will be understood that many changes may be made in the method set forth herein without departing from the spirit of the invention. I, therefore, do not wish to be limited to the exact method described as it has been set forth only by way of illustration.

It is also to be understood that the invention is not to be limited to the specific glasses set forth herein owing to the fact that all glass surfaces whether containing silica or not as part of their chemical composition do adsorb moisture and/or other gases in amounts which may be detrimental to the fabrication of multifocal lenses therefrom.

Having described my invention, I claim:

1. In the art of heat-joining the polished surfaces of pieces of glass susceptible to the formation of a hydrated silicate film on said surfaces, the steps of cleansing said pieces in a bath of water containing organic and/or inorganic contaminating ions subsequent to the forming of said polished surfaces thereon to remove foreign matter therefrom, refrigerating said pieces at a temperature near 0° F. directly following said cleaning and for a time interval sufficient to substantially dehydrate said pieces, removing said pieces from said refrigeration subsequent to said dehydration, dipping said dehydrated pieces of glass directly into a bath substantially at room temperature of water containing organic and/or inorganic contaminating ions to raise the temperature of said pieces above the dew point, drying and cleansing said pieces to remove foreign matter therefrom and assembling and fusing the polished surfaces thereof together within a time interval of from three to five hours.

2. In the art of heat-joining pieces of glass at least one of which is susceptible to the formation of a hydrated silicate film on a surface thereof when said surface is polished, the steps of forming polished surfaces on said pieces of glass, cleansing said piece of glass in a bath of water containing organic and/or inorganic contaminating ions, refrigerating said pieces at temperature near 0° F. within a time interval of from one to two hours following the polishing of said surfaces and for a time interval sufficient to substantially dehydrate said pieces, removing said pieces from said refrigeration subsequent to said dehydration, directly subjecting said dehydrated pieces of glass to a bath substantially at room temperature of water containing organic and/or inorganic contaminating ions to raise the temperature of said pieces above the dew point, directly drying and cleansing said pieces to remove foreign matter therefrom and assembling and fusing the polished surfaces thereof together within a time interval less than that which will permit the formation of a hydrated silicate film of an amount less than that which will cause detrimental interfacial bubbles to form on said polished surfaces during said fusing thereof.

3. In the art of heat-joining pieces of glass susceptible to the formation of a hydrated silicate film on the surfaces thereof, the steps of forming a finished polished surface on each of said pieces of glass to be joined, cleansing said pieces in contaminated water heated to a temperature of from 125° to 135° F. to remove foreign matter therefrom, refrigerating said pieces at a temperature near 0° F. directly subsequent to said cleansing and for a time interval sufficient to substantially dehydrate said pieces, removing said pieces from said refrigeration subsequent to said dehydration, directly subjecting said dehydrated pieces of glass to a contaminated water bath substantially at room temperature to raise the temperature of said pieces of glass above the dew point, drying and cleansing the surfaces of said pieces of glass to remove foreign matter therefrom and assembling and fusing said polished surfaces thereof together within a time interval of from three to five hours.

4. In the art of forming fused blanks for multifocal lenses embodying a major piece of glass having a high silica content and a minor piece of glass different from that of said major piece of glass, and which pieces of glass are susceptible to the formation of a hydrated silicate film on the surfaces thereof, the steps of forming a countersink having a finished optical surface in said major piece of glass, forming an optical surface on said minor piece of glass to be fused within said countersink, cleansing said pieces of glass in a hot contaminated water bath, refrigerating said pieces of glass to a near 0° F. temperature directly subsequent to said cleansing and for a time interval sufficient to substantially dehydrate said pieces of glass, removing said pieces from said refrigeration subsequent to said dehydration, directly subjecting said dehydrated pieces of glass to a contaminated water bath substantially at room tempertaure to raise the temperature of said pieces above the dew point, drying and cleansing said pieces of glass, assembling said pieces of glass with said minor piece in superimposed relation with the countersink in the major piece of glass, and subjecting said assembled pieces to heat of a temperature sufficient to heat and fuse said pieces of glass and within a time interval of from three to five hours.

5. In the art of heat-joining pieces of glass at least one of which is susceptible to the formation of a hydrated silicate film on a surface thereof when said surface is polished, the steps of cleansing said pieces in a bath of water containing organic and/or inorganic contaminating ions subsequent to the forming of said polished surfaces thereon to remove foreign matter therefrom, refrigerating said pieces to a temperature below freezing and for a time interval sufficient to substantially dehydrate said pieces, removing said pieces from said refrigeration subsequent to said dehydration, dipping said dehydrated pieces of glass directly into a bath substantially at room temperature of water containing organic and/or inorganic contaminating ions to raise the temperature of said pieces above the dew point, drying and cleansing said pieces to remove foreign matter therefrom, and assembling and fusing the polished surfaces thereof together within a time interval less than is required in having a hydrated silicate film of an amount which will cause detrimental interfacial bubbles to form on said polished surfaces during the fusing operation.

References Cited in the file of this patent

UNITED STATES PATENTS

| | | |
|---|---|---|
| 1,647,785 | Coughlin | Nov. 1, 1927 |
| 2,089,261 | Hopkins | Aug. 10, 1937 |
| 2,640,299 | Sheard | June 2, 1953 |